United States Patent
Ridenour et al.

(10) Patent No.: US 11,733,037 B2
(45) Date of Patent: Aug. 22, 2023

(54) SYSTEMS AND METHODS FOR PROVIDING A BAROMETRIC ALTITUDE MONITOR

(71) Applicant: AVIATION COMMUNICATION & SURVEILLANCE SYSTEMS, LLC, Phoenix, AZ (US)

(72) Inventors: Richard Darrell Ridenour, Peoria, AZ (US); Charles Castel Manberg, Phoenix, AZ (US)

(73) Assignee: Aviation Communication & Surveillance Systems, LLL, Phoenix, AZ (US)

(*) Notice: Subject to any disclaimer, the term of this patent is extended or adjusted under 35 U.S.C. 154(b) by 601 days.

(21) Appl. No.: 16/591,495

(22) Filed: Oct. 2, 2019

(65) Prior Publication Data
US 2020/0103228 A1    Apr. 2, 2020

Related U.S. Application Data

(60) Provisional application No. 62/740,278, filed on Oct. 2, 2018.

(51) Int. Cl.
*G01C 5/06* (2006.01)
*B64D 45/04* (2006.01)
(Continued)

(52) U.S. Cl.
CPC .............. *G01C 5/06* (2013.01); *B64D 45/04* (2013.01); *G01C 5/005* (2013.01); *G01S 1/18* (2013.01);
(Continued)

(58) Field of Classification Search
CPC .......... G01C 5/06; G01C 5/005; B64D 45/04; B64D 45/0029; B64D 45/0053;
(Continued)

(56) References Cited

U.S. PATENT DOCUMENTS 3,750,473 A * 8/1973 Bennett .................... G01C 5/06
                                                    73/387
3,789,391 A * 1/1974 Brock ..................... G01C 5/005
                                                    341/113
(Continued)

FOREIGN PATENT DOCUMENTS

CH          660157 A5 *  3/1987
EP         1843127 A2   10/2007
(Continued)

OTHER PUBLICATIONS

Wikipedia Contributors. (Jul. 10, 2017). Signal averaging. Wikipedia. Retrieved Feb. 2, 2022, from https://web.archive.org/web/20170710042844/https://en.wikipedia.org/wiki/Signal_averaging (Year: 2017).*

(Continued)

*Primary Examiner* — Daniel R Miller
*Assistant Examiner* — Eric Sebastian Von Wald
(74) *Attorney, Agent, or Firm* — Dickinson Wright PLLC

(57) ABSTRACT

There are provided systems and methods for providing a barometric altitude monitor that assist pilots by providing alerts when a barometric altitude of the ownship aircraft is may be incorrect. Various embodiments of the present invention determine whether significant errors in barometric altitude occur though comparisons to alternate altitude information sources. Through aspects of the present invention, errors arising from manual entry of barometric pressure information by a pilot may be identified before safety issues arise, thus helping to prevent events such as controlled flight into terrain (CFIT).

9 Claims, 5 Drawing Sheets

(51) Int. Cl.
*G01C 5/00* (2006.01)
*G01S 1/18* (2006.01)
*G01S 19/20* (2010.01)
*G01W 1/02* (2006.01)
*G08G 5/00* (2006.01)

(52) U.S. Cl.
CPC ............... *G01S 19/20* (2013.01); *G01W 1/02* (2013.01); *G08G 5/0008* (2013.01); *G08G 5/0021* (2013.01)

(58) Field of Classification Search
CPC ........ B64D 45/0059; B64D 2045/0085; G08G 5/0008; G08G 5/0004; G08G 5/0017; G08G 5/0021; G08G 5/003; G08G 5/0039; G08G 5/0047; G08G 5/0056; G08G 5/0086; G08G 5/0091; G08G 5/0095; G08G 5/025; G01S 1/18; G01S 1/02; G01S 1/022; G01S 1/0426; G01S 1/047; G01S 1/06; G01S 19/20
See application file for complete search history.

(56) References Cited

U.S. PATENT DOCUMENTS

| | | | | |
|---|---|---|---|---|
| 4,453,154 A * | 6/1984 | Rait | ............ | G01C 5/06 340/626 |
| 5,402,116 A * | 3/1995 | Ashley | ............ | G01C 5/005 340/870.1 |
| 5,671,162 A * | 9/1997 | Werbin | ............ | G01C 5/06 73/178 R |
| 5,781,126 A * | 7/1998 | Paterson | ............ | G05D 1/0607 701/4 |
| 6,020,832 A * | 2/2000 | Jensen | ............ | G01S 13/935 701/4 |
| 6,937,937 B1 * | 8/2005 | Manfred | ............ | G01W 1/10 340/971 |
| 7,145,501 B1 * | 12/2006 | Manfred | ............ | G01S 13/89 342/120 |
| 7,479,923 B2 * | 1/2009 | Carpenter | ............ | G08G 5/0052 342/357.62 |
| 8,723,695 B2 * | 5/2014 | Bourret | ............ | G01S 13/935 701/4 |
| 9,243,906 B1 * | 1/2016 | Conrad | ............ | G01C 5/06 |
| 9,561,868 B2 * | 2/2017 | Bourret | ............ | G05D 1/042 |
| 10,591,293 B2 * | 3/2020 | Gadicherla | ............ | G01C 5/06 |
| 2004/0186635 A1 | 9/2004 | Manfred | | |
| 2006/0247828 A1 * | 11/2006 | Ardila | ............ | G01C 5/005 701/14 |
| 2009/0189787 A1 * | 7/2009 | Khatwa | ............ | G08G 5/0086 340/970 |

FOREIGN PATENT DOCUMENTS

| | | |
|---|---|---|
| EP | 2085748 A2 | 8/2009 |
| GB | 2472497 A | 2/2011 |

OTHER PUBLICATIONS

Wikipedia Contributors. (Sep. 24, 2018b). Weighted arithmetic mean. Wikipedia. Retrieved Feb. 2, 2022, from https://web.archive.org/web/20180924221425/https://en.wikipedia.org/wiki/Weighted_arithmetic_mean (Year: 2018).*

Root Mean Square (RMS) v Root Sum of Squares (RSS) in uncertainty analysis. (Feb. 24, 2021). Pathology Uncertainty, https://pathologyuncertainty.com/2018/02/21/root-mean-square-rms-v-root-sum-of-squares-rss-in-uncertainty-analysis/ (Year: 2018).*

International Search Report dated Jan. 16, 2020, for related international patent application No. PCT/US2019/054360, filed Oct. 2, 2019, 14 pages, issued by the European Patent Office.

* cited by examiner

SYSTEMS AND METHODS FOR PROVIDING A BAROMETRIC ALTITUDE MONITOR

CROSS REFERENCE TO RELATED APPLICATIONS

This application claims the full benefit of and priority to U.S. provisional patent application No. 62/740,278 filed Oct. 2, 2018 titled, "SYSTEMS AND METHODS FOR PROVIDING A BAROMETRIC ALTITUDE MONITOR," the disclosure of which is fully incorporated herein by reference for all purposes.

FIELD AND BACKGROUND OF THE INVENTION

Field of the Invention

The present disclosure relates to avionics systems for altitude determination. More particularly, the present disclosure provides systems and methods to provide a barometric altimeter monitor to assist pilots with correctly adjusting and entering altimeter information at appropriate times during flight.

Background of the Invention

The barometric altimeter is the primary instrument a pilot uses to determine the altitude of the aircraft. A barometric altimeter measures the ambient air pressure at the aircraft's location. It then uses the known relationship between air pressure and altitude to display the corresponding altitude to the pilot.

Modern altimeters can be adjusted to account for the normal variations of atmospheric air pressure due to weather patterns. Pilots adjust the altimeters based on the local air pressure when the aircraft is operating at low altitudes. This ensures proper terrain clearance. Above a certain altitude, known as the "transition altitude," pilots adjust the altimeter to a common pressure setting. This common setting, known as Standard, is based on a sea level pressure of 29.92 inches of mercury, or 1013 hPa (or 1013 mbar), and once this mode is entered it may referred to as Standard mode or "STD." Although the Standard setting may not typically correspond to the local atmospheric conditions, the use of a common setting at high altitude ensures that all aircraft are using the same reference. Further, transition altitudes vary from country to country and in some cases from airport to airport. More particularly, transition altitudes may vary considerably between about 3,000 ft and 18,000 ft. The USA and Canada have a common transition altitude of 18,000 ft.

Because manual entry of barometric pressure information is required during certain times during flight (or before takeoff), it is possible for a pilot to forget to adjust the altimeter or to incorrectly adjust the altimeter. This can lead to an incorrect altitude. Various monitor designs exist which attempt to determine when the altimeter is not correctly set. Some designs, such as the design described in U.S. Pat. No. 7,778,745, the disclosure of which is fully incorporated by reference herein for all purposes, require a database of transition altitudes. Among other difficulties with this approach, the database adds cost to the design and requires the operator to update the database any time a transition altitude changes.

SUMMARY OF THE INVENTION

The following technical disclosure is exemplary and explanatory only and is not necessarily restrictive of the invention as claimed.

There are provided systems and methods for providing a barometric altitude monitor that provide for correct calibration of aircraft altimeters. An embodiment of the present invention includes a method that comprises determining that a barometric altimeter in an ownship aircraft is configured in a mode other than standard (STD) mode; comparing a corrected altitude measurement from the barometric altimeter to a second source of altitude information; and generating an alert if the compared corrected altitude measurement deviates from the second source of altitude information by a predetermined altitude error threshold. The second source of information may comprise any desired source of altitude information, including a geoposition or GPS-determined altitude of the ownship aircraft, or in another embodiment, a sum of a radio altitude of the ownship aircraft and a terrain elevation proximate to the ownship aircraft, or in yet another embodiment, altitude measurements received from a transmission from a second aircraft in proximity to the ownship aircraft. Further, the second source of information comprises an average or a weighted average of: a GPS-determined altitude of the ownship aircraft; and a sum of a radio altitude of the ownship aircraft and a terrain elevation proximate to the ownship aircraft. The weights in the weighted average may be selected to satisfy any desired criterion, such as to emphasize GPS altitude when its known accuracy is high, or to emphasize radio altitude and known elevation in terrain where GPS readings may not be as accurate. In an embodiment, the predetermined altitude error threshold may be any selected value or range, and in one aspect is selected from a range of plus or minus 0.5% to plus or minus 10% of the corrected altitude measurement. Further, in various embodiments, the selected altitude error threshold may represents the expected error between the barometric altitude source and second source to a 99.999% level of certainty.

Various embodiments of a method of the present invention also comprise detecting that an altimeter of the ownship aircraft is configured in Standard (STD) setting and generating an alert if a radio altitude measurement of the ownship aircraft is less than a predetermined minimum radio altitude threshold. Further, in various embodiments, the predetermined minimum radio altitude threshold is within a range of 500 feet to 4500 feet, or more preferably, within a range of 1500 feet to 2500 feet. Alerts may be cancelled to prevent undue interference with cockpit personnel, and in one embodiment, an alert may be canceled if the corrected altitude measurement no longer deviates from the second source of altitude information by a predetermined altitude error threshold, or cancelling the alert if the radio altitude measurement of the ownship aircraft is greater than or equal to the predetermined minimum radio altitude threshold.

An additional embodiment of the present invention provides a method comprising determining that a radio altitude measurement of the ownship aircraft is less than a predetermined minimum radio altitude threshold; comparing a corrected altitude measurement from the barometric altimeter to a second source of altitude information; and generating an alert if the compared corrected altitude measurement deviates from the second source of altitude information by a predetermined altitude error threshold.

In addition to comparing the barometric corrected altitude to other altitude sources on the aircraft, checking the proper setting of the aircraft's altimeter comprises comparing the actual altimeter setting on the ownship aircraft with the altimeter setting reported by other nearby aircraft. This additional check could be used independently or in combination with any of the embodiments of the present invention described above. For example The "Barometric Pressure Setting (Minus 800 millibars)" is transmitted as part of the ADS-B Out dataset. By receiving transmissions from nearby aircraft and decoding their barometric altitude information, this may serve as an additional secondary source of altitude information for identifying whether there may be a discrepancy between the barometric setting on ownship's altimeter and any altimeter on another aircraft. In addition, where there is barometric altitude agreement among multiple nearby aircraft, but there is a disagreement between the other nearby aircraft and ownship, this may suggest that ownship's altimeter is not correctly set. An alert could therefore be generated in this or any other desired case.

BRIEF DESCRIPTION OF THE DRAWINGS

A more complete understanding of the present invention may be derived by referring to the detailed description and claims when considered in connection with the following illustrative figures.

DETAILED DESCRIPTION

Figure 1:
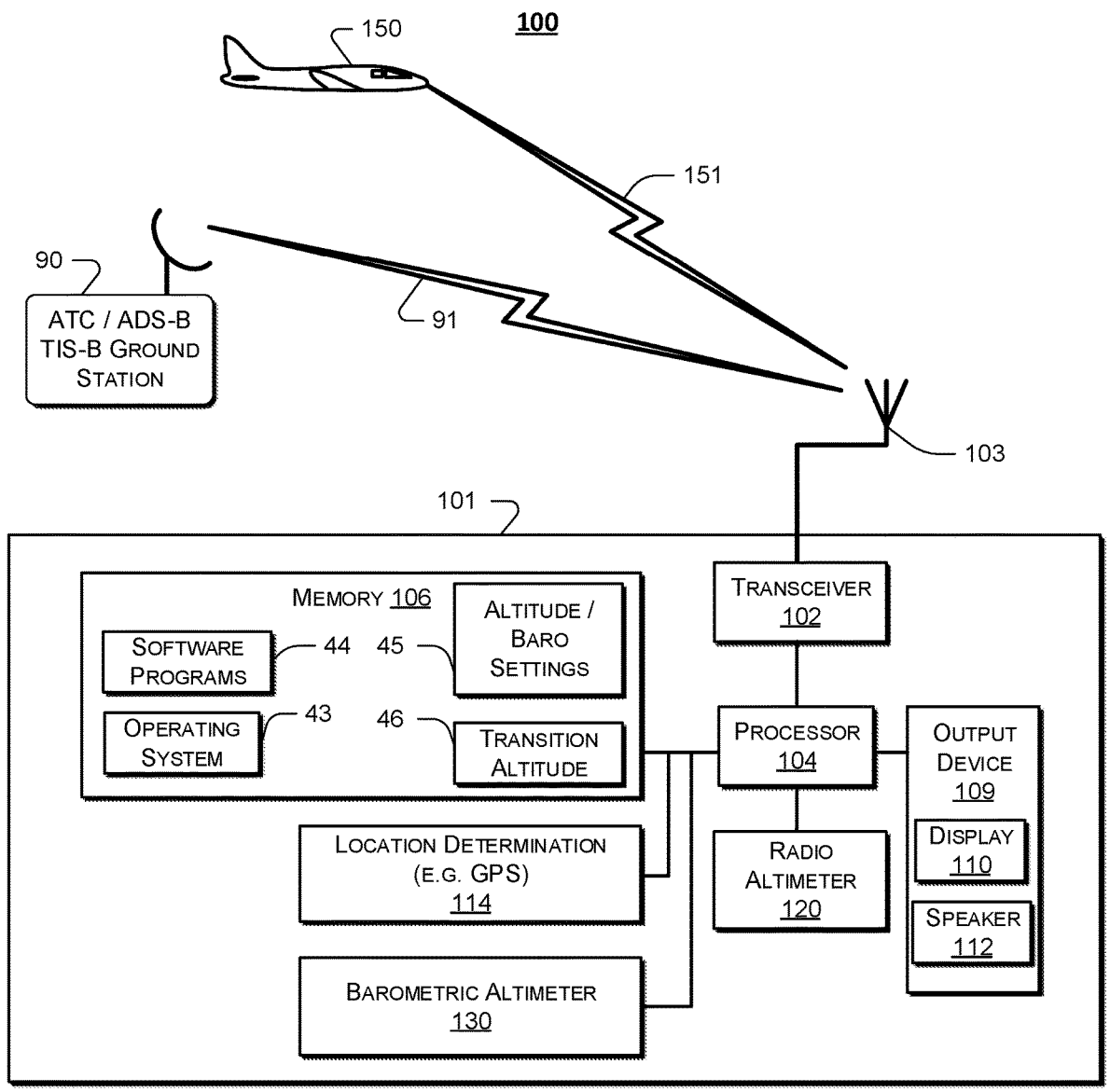
FIG. 1 illustrates a block diagram of a system embodiment of the present invention.

Referring to FIG. 1, a system embodiment 100 of the present invention is depicted. The block 101 represents avionic systems disposed within an ownship aircraft, and may incorporate separate components, or may be integrated in whole or in part within a larger system such as a standard Flight Management System or FMS. An embodiment includes a processor 104 electrically coupled to a memory 106, a transceiver 102 electrically coupled to the processor 104; an output device 109, in the cockpit of the ownship aircraft including a display 110 and speaker 112 electrically coupled to the processor 104 (for producing alerts of a visual nature, aural nature, or both) an radio altimeter 120 electrically coupled to the processor 104; a location determination device, for example a GPS device 114, electrically coupled to the processor 104, and a barometric altimeter 130 electrically coupled to the processor 104. The memory 106 may contain a variety of data, such as software programs 44 that may be used in execution of embodiments of the present invention, an operating system 43, altitude/barometric settings and information 45 that stores current barometric measurements and settings (including, optionally, any barometric compensation amounts) and transition altitude 46 that may include a selected transition altitude for the particular region of flight. An antenna 103 that is in signal communication with transceiver 102 receives signals 91, 151, that may comprise ADS-B signals or other aviation-related signals that include altitude information of a second aircraft 150 that is within the local vicinity of the ownship aircraft to further increase accuracy of altitude calculations. For example, nearby aircraft 150 may, as part of its ADS-B transmissions, provide its current altitude or Barometric Pressure Setting (minus 800 millibars), and as the nearby aircraft 150 is proximate to or within the vicinity of the ownship aircraft, its received altitude information may be used as a reference to confirm or identify a discrepancy in the barometric altitude measurement of the ownship aircraft. Further, altitude measurements of either the ownship aircraft or second aircraft 150 may be received from a ground station 90 and used for confirmation of current barometric altitude of the ownship aircraft.

Figure 2:
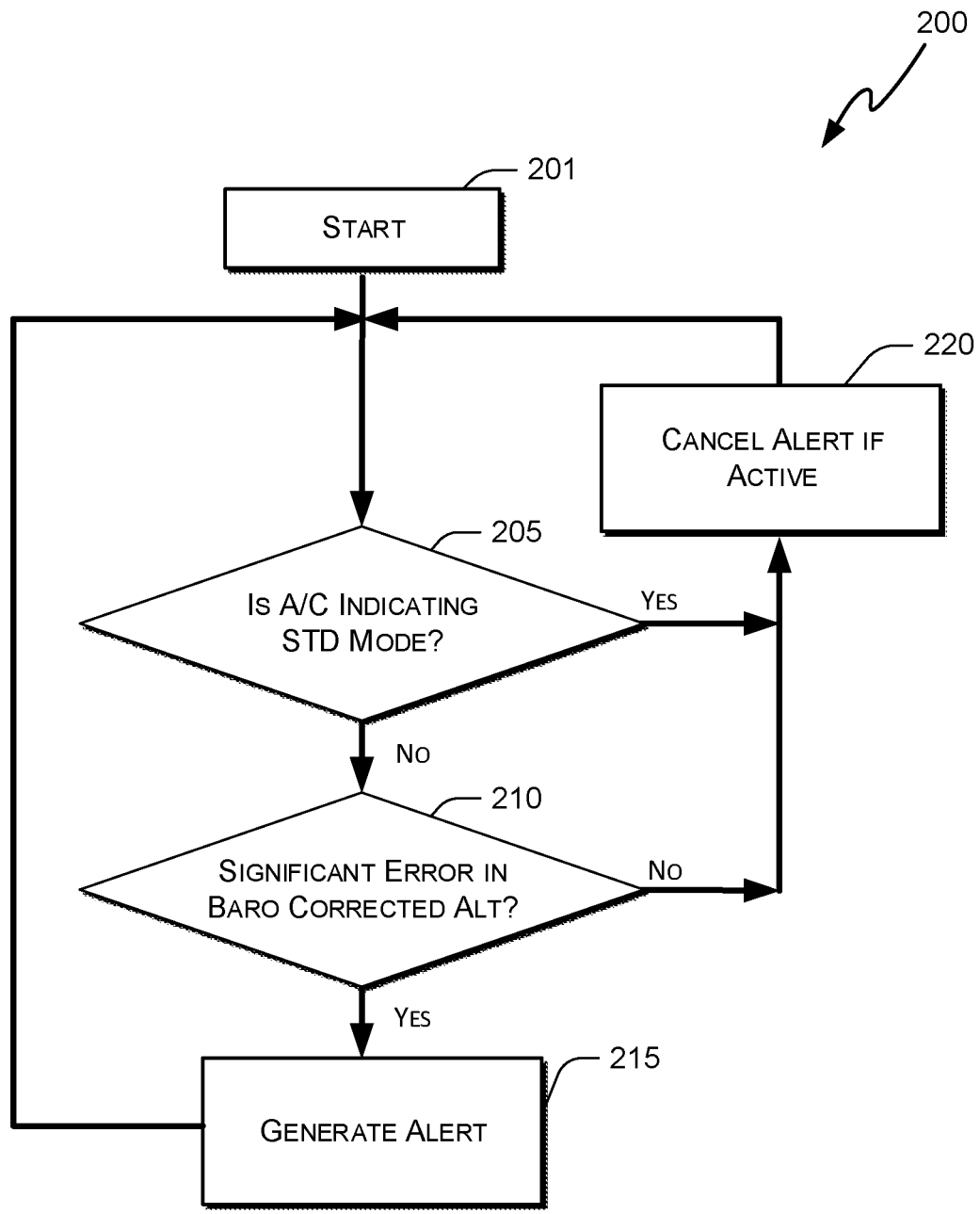
FIG. 2 illustrates a flow diagram of an embodiment of the present invention.

Embodiments of the present invention may monitor the barometric mode setting from the aircraft, and as such, FIG. 2 illustrates an embodiment of a process 200 of the present invention. A determination is made 205 whether the barometric mode setting of the aircraft's altimeter is set to a mode other than Standard or "STD," and if so, the process may monitor the apparent accuracy of the barometric corrected altitude 210. The corrected altitude may be compared to GPS/geolocation altitude, as well as the sum of radio altitude and the terrain elevation, or an average of the GPS and combined radio plus terrain altitude measurements. If the corrected altitude is not consistent with the other measurements of aircraft altitude, then an alert may be provided 215 to the pilot. For example, in an embodiment a comparison is made between a corrected altitude measurement from the barometric altimeter to a second source of altitude information (such as a geolocation/GPS altitude, or a radio altitude plus altitude above terrain), and an alert is generated if the compared corrected altitude measurement deviates from the second source of altitude information by a predetermined altitude error threshold. The predetermined altitude error threshold may be determined by any desired technique, such as by plus or minus 3% of the corrected altitude measurement, or a fixed altitude range. If the aircraft is indicating STD mode 205 or if there is no detected significant error in the corrected barometric altitude 210, an alert may be cancelled 220 if active.

In various embodiments, an altitude error threshold may be a statistically derived threshold. Such a threshold would be dynamic and depend on multiple factors. For example, in one scenario, if it is known that statistically speaking, the real atmosphere varies from an idealized atmospheric model by an amount that depends on altitude and air temperature, aspects of the invention can quantify how much "error" in the barometric altitude is reasonable/probable given the known model and the actual atmospheric variations. Further, if an altitude calculated based on the ambient pressure and assuming an idealized atmosphere is on average correct, and may have a standard variation (or in some embodiments, standard deviation) such that the calculation is may provide a range of 6 feet per 100 feet of altitude. Thus, a "one sigma" error due to altitude would be 6 feet per 100 feet. Further, in various embodiments, to estimate how large of an error could be expected at the 95th percentile, embodiments could calculate 1.96 times the sigma error (i.e., 1.96 sigma equates to 95% when there is normal or Gaussian distribution). Similarly, embodiments could calculate a 99.9% expected error as 3.3 times sigma or a 99.999% expected error as 4.4 times sigma.

In addition to the expected error that is a function of altitude, for various embodiments, there may be an altitude error threshold that is a function of temperature. In this embodiment, the further the atmospheric temperature at a given attitude is from "standard," the larger the altitude error might be. For example, in one aspect, for every degree Celsius of temperature deviation from standard temperature, the standard deviation of altitude error is 10 feet. Thus, when the atmospheric temperature is 10 deg C. warmer than standard, the temperature-based sigma would be 100 feet. Here again aspects of the present invention could calculate a 4.4 sigma value to determine the altitude error that could be expected at the 99.999 percentile.

In additional embodiments, other error sources could similarly be characterized. Additional error sources include not only error sources in the barometric altitude, but errors in the "truth" source, such as GPS. For instance, VFOM gives a 95% (1.96 sigma) vertical error estimate for GPS. Thus, embodiments could calculate a 4.4 sigma error for GPS based on that estimate.

Additionally, an overall expected error could then be calculated by root-sum-squaring the various errors. The resulting value would be the threshold that could be used to trigger an alert. For instance, if the difference between the barometric altitude and the GPS altitude is 150 feet and the 99.999% expected error is 149 feet, the system could determine, with 99.999% confidence, that the difference between the barometric altitude and the GPS altitude was due to something other than "reasonably expected" inaccuracies in the barometric and GPS altitudes; this would be the point when an alert would be generated.

Figure 3:
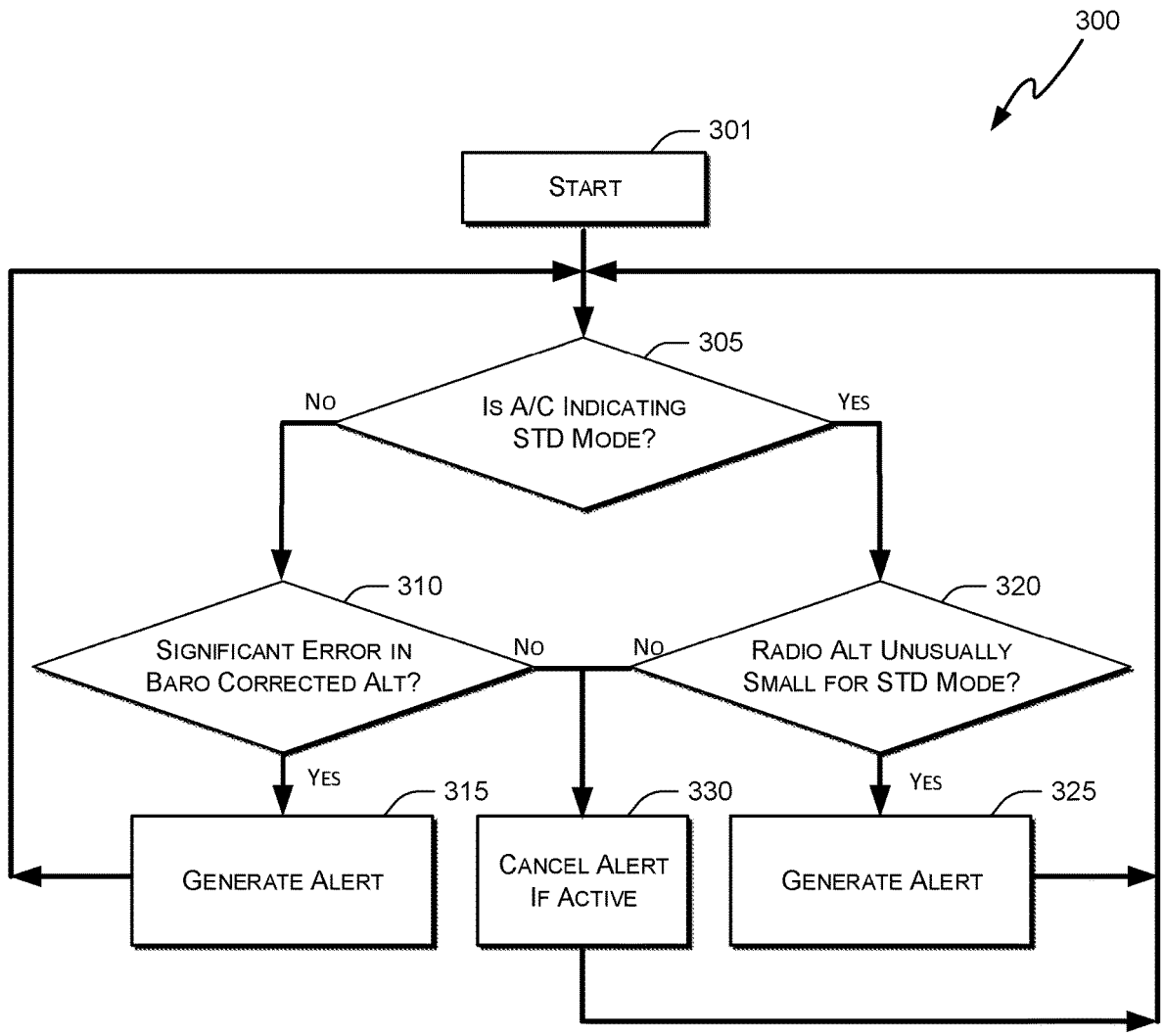
FIG. 3 shows an alternative flow diagram for an embodiment of the present invention.

FIG. 3 illustrates another embodiment of a process 300 of the present invention. In one aspect of this embodiment, similarly to the process shown in FIG. 2, a check is made 305 as to whether the barometric altimeter of the ownship aircraft is operating when the aircraft is not in STD mode, and if not, the reasonableness of barometric corrected altitude may be measured 310 by comparing it to a secondary altitude source, such as geolocation/GPS altitude, or the sum of radio altitude and the terrain elevation, or an average of these values. If the corrected altitude is not consistent with the other two measurements of aircraft altitude, then an alert 315 may be provided to the pilot. Additionally, if the process detects 305 that the altimeter is still in STD setting and the radio altitude is less than a set threshold 320, the process may generate an alert 325 to the flight crew. This alert may be based on the fact that once the aircraft is relatively close to terrain, STD may not be the proper setting. Relative closeness to terrain may be determined by any desired method; in one embodiment, relative closeness to terrain may be determined by radio altitude being less than a predetermined distance such as 1500 feet or in a range of 500 feet to 4500 feet, an alert may be produced. If neither a significant error in the corrected barometric altitude is detected 310 nor the radio altitude is found to be unusually small for STD mode 320, alerts are cancelled if currently active, i.e., once the triggering condition is corrected.

Figure 4:
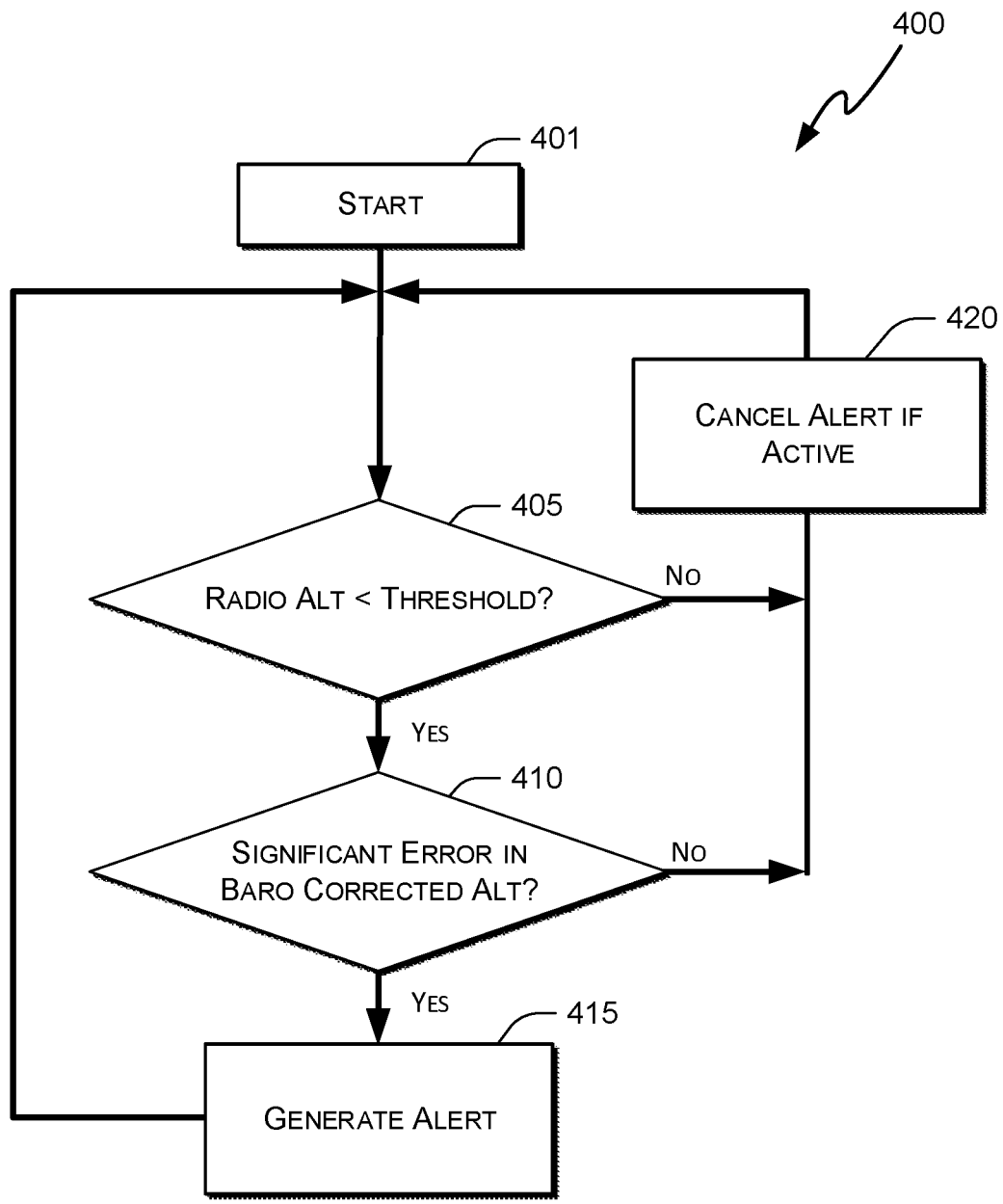
FIG. 4 shows a flow diagram of another embodiment of the present invention.

FIG. 4 illustrates yet another embodiment of a process 400 of the present invention. In this embodiment, a process of the present invention may check 405 to see if the radio altitude reading is below a certain threshold, indicating that the aircraft may be relatively close to terrain. When the radio altitude is sufficiently small, the process may compare 410 the barometric corrected altitude to a secondary source of altitude, such as the geolocation/GPS altitude, as well as the sum of radio altitude and terrain elevation. If the corrected altitude is not consistent with the other secondary measurements of aircraft altitude, then an alert 415 may be provided to the pilot. If conditions 405, 410 are determined negatively, alerts are cancelled 420 if they were currently activated.

Figure 5:
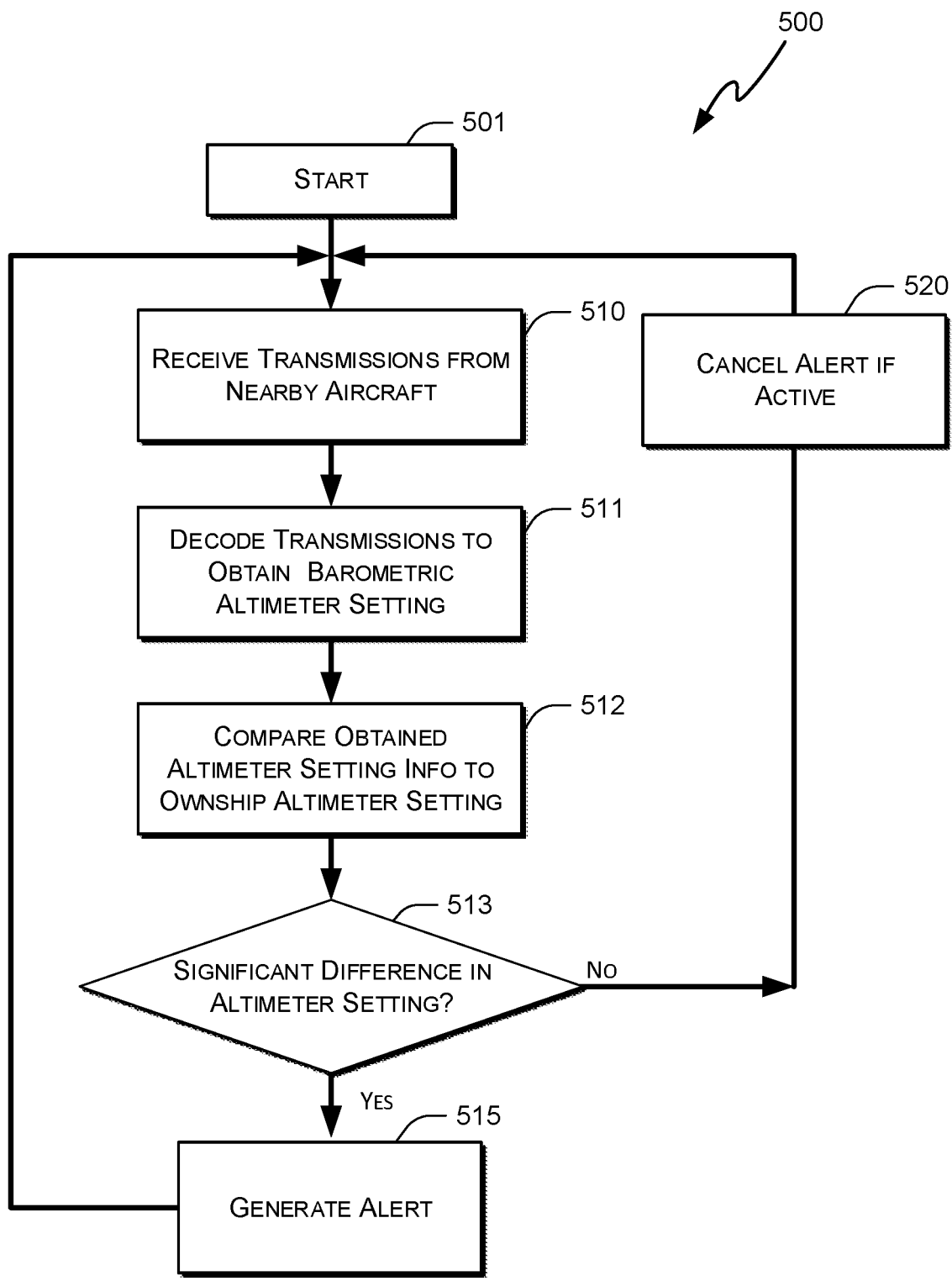
FIG. 5 shows another flow diagram of another embodiment of the present invention.

FIG. 5 illustrates a further embodiment of a process 500 of the present invention. As mentioned above, transmissions from nearby aircraft, such as ADS-B transmissions, may provide a secondary source of information regarding barometric altitude information, and more particularly, to confirm the accuracy of ownship's barometric altimeter setting. A process of the present invention obtains 510 transmissions from a nearby aircraft, or a plurality of nearby aircraft, and may and may respectively decode such transmissions to obtain respective barometric altitude information for each of the nearby transmitting aircraft, which further comprises a barometric altimeter setting (e.g. 29.55 inches of mercury). The barometric altimeter setting, whether a single value for a single nearby aircraft, or a plurality of values for a plurality of nearby aircraft, may be compared 513 to the current barometric altimeter setting of the ownship aircraft to determine whether a significant amount of discrepancy exists between ownship's barometric altimeter setting and nearby aircraft's reported barometric altimeter settings. If the difference between ownship's barometric altimeter setting and a single value of barometric altimeter setting corresponding to the single nearby aircraft exceeds a predetermined threshold (for example, but not by way of limitation, more than 0.5 inches mercury or 17 millibars, although larger values may be utilized such as 1 inch mercury or 34 millibars), then an alert 515 may be provided to the pilot. Similarly, if the difference between ownship's barometric altimeter setting and an average of a plurality of barometric altimeter settings corresponding to a plurality of nearby aircraft exceeds a predetermined for example, but not by way of limitation, more than 0.5 inches mercury or 17 millibars, although larger values may be utilized such as 1 inch mercury or 34 millibars), then an alert 515 may be provided to the pilot. If condition 513 is determined negatively, an alert may be cancelled 520 if it was currently activated.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:
1. A method comprising:
   determining that a barometric altimeter in an ownship aircraft is configured in a mode other than standard (STD) mode;
   comparing a corrected altitude measurement from the barometric altimeter to a second source of altitude information, the second source of altitude information comprising one of an average and a weighted average of:
      a GPS-determined altitude of the ownship aircraft; and
      a sum of a radio altitude of the ownship aircraft and a terrain elevation proximate to the ownship aircraft; and
   generating an alert in response to determining that the corrected altitude measurement deviates from the second source of altitude information by more than the variable altitude error threshold.

2. The method of claim 1 wherein the variable altitude error threshold is within a range of 500 feet to 4500 feet.

3. The method of claim 1 further comprising:
cancelling the alert in response to determining that the corrected altitude measurement no longer deviates from the second source of altitude information by the variable altitude error threshold.

4. The Method of claim 1 further comprising
cancelling the alert in response to determining that a subsequent radio altitude measurement of the ownship aircraft is greater than or equal to the variable minimum radio altitude threshold.

5. The method of claim 1, further comprising:
determining whether the corrected altitude measurement from the barometric altimeter deviates from the second source of altitude information by more than a variable altitude error threshold which is a non-linear function of temperature,
wherein the function of temperature is such that for each degree Celsius of deviation of the temperature from a standard temperature, a standard deviation of altitude error is ten feet.

6. The method of claim 1, further comprising:
determining whether the corrected altitude measurement from the barometric altimeter deviates from the second source of altitude information by more than a variable altitude error threshold which is a non-linear function of temperature,
wherein the non-linear function of temperature is a root-sum-square function.

7. A method comprising:
determining that a radio altitude measurement of an ownship aircraft is less than a predetermined minimum radio altitude threshold;
comparing a corrected altitude measurement from a barometric altimeter to a second source of altitude information, the second source of altitude information comprising one of an average and a weighted average of:
a GPS-determined altitude of the ownship aircraft; and
a sum of a radio altitude of the ownship aircraft and a terrain elevation proximate to the ownship aircraft; and
generating an alert in response to determining that the corrected altitude measurement deviates from the second source of altitude information by more than the variable altitude error threshold.

8. The method of claim 7, further comprising:
determining whether the corrected altitude measurement from the barometric altimeter deviates from the second source of altitude information by more than a variable altitude error threshold which is a non-linear function of temperature,
wherein the function of temperature is such that for each degree Celsius of deviation of the temperature from a standard temperature, a standard deviation of altitude error is ten feet.

9. The method of claim 7, further comprising:
determining whether the corrected altitude measurement from the barometric altimeter deviates from the second source of altitude information by more than a variable altitude error threshold which is a non-linear function of temperature,
wherein the non-linear function of temperature is a root-sum-square function.

* * * * *